Patented Nov. 17, 1942

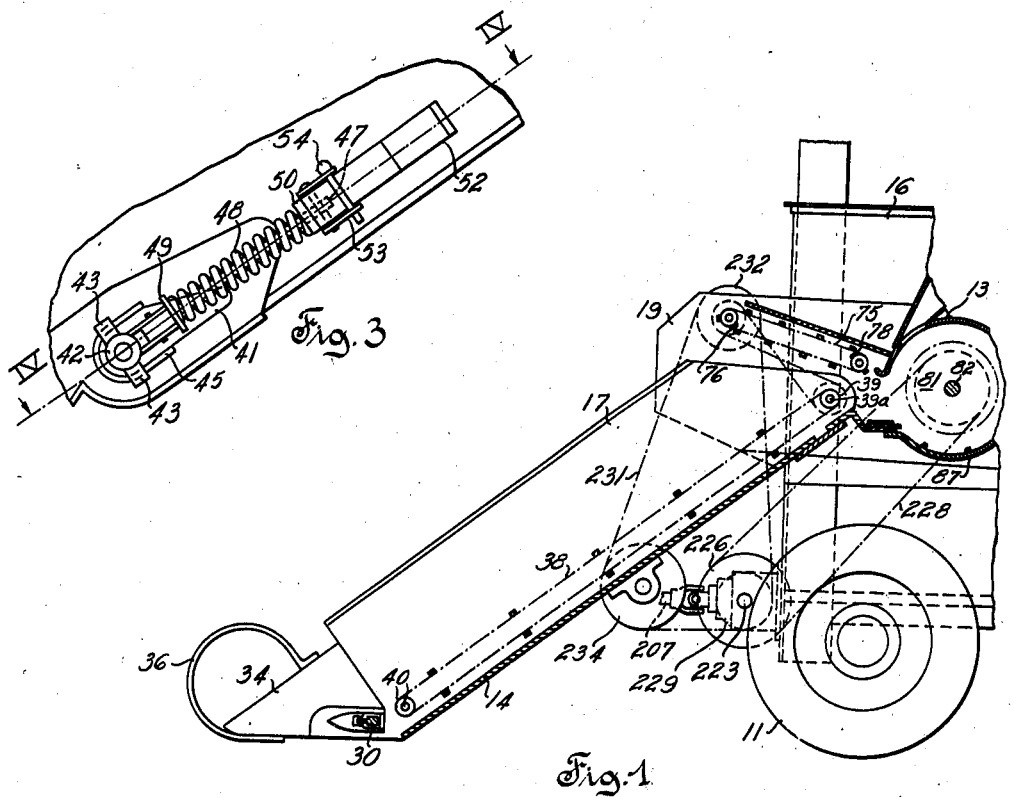
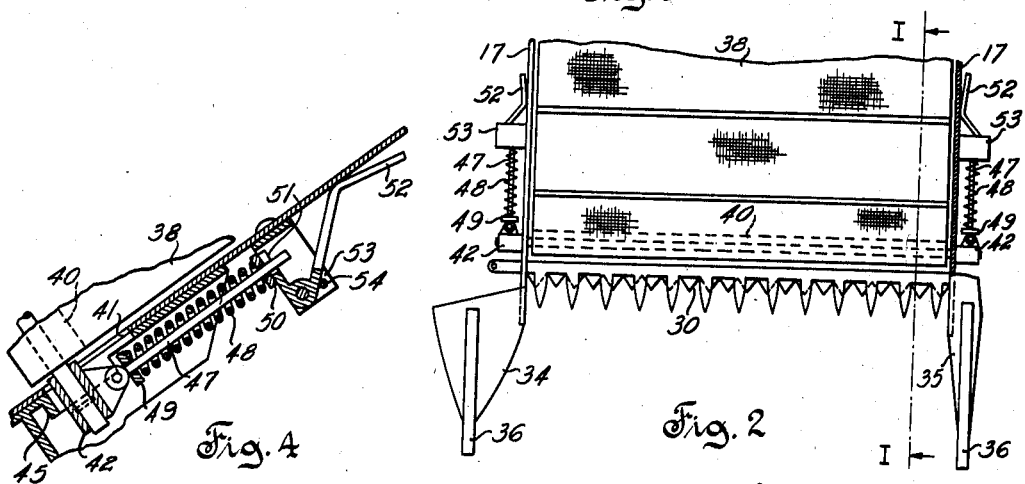

2,302,656

UNITED STATES PATENT OFFICE 2,302,656

CONVEYING MECHANISM FOR HARVESTERS

Walter R. Dray, Kendall Township, Kendall County, Ill., assignor to Allis-Chalmers Manufacturing Company, Milwaukee, Wis., a corporation of Delaware Original application July 1, 1935, Serial No. 29,216, now Patent No. 2,262,453, dated November 11, 1941. Divided and this application June 29, 1940, Serial No. 343,124

3 Claims. (Cl. 198—208)

This invention relates in general to improvements of utility in harvesting machines, and especially that type thereof known as harvester-threshers or combines, which are capable of gathering the crop and threshing the same during the travel of the machine through the field; and the invention is more particularly concerned with improvements applicable to the mounting of endless feeding draper belts of such machines.

The present application is a division of applicant's copending application, Serial No. 29,216, filed July 1, 1935, issued as U. S. Patent No. 2,262,453, November 11, 1941.

In the use of endless traveling feeding conveyers of the draper belt type in harvester-threshers for conveying the cut grain or the like away from the cutting sickle and rearwardly toward the threshing mechanism, it is desirable that such draper belt, which is usually made of canvas or like heavy fabric, be maintained satisfactorily taut under the various conditions to which the machine is subjected, particularly with respect to atmospheric humidity and moisture adhering to the stalks during operation of the machine. And since moisture may adversely effect the useful life of the draper belt unless the latter is relieved of the undue tension due to such moisture or like conditions, and in the interest of prolonging the useful life of the draper belt and maintaining the machine in satisfactory working condition, it is highly desirable that suitable provisions be made for relieving the belt of any such undue tension.

The present invention contemplates and has for an object thereof the provision of an improved and simple design and construction of mounting for an endless draper belt of utility as the feeding conveyer from the cutting or harvesting mechanism to the threshing mechanism of a harvester-thresher or the like, which insures a proper degree of tautness under the various working conditions of the apparatus.

It is a further object of this invention to provide an improved design of mounting and operating means for a flexible traveling conveyer, particularly one of the draper belt type, for use in conveying the severed crop directly from the harvesting mechanism to the threshing mechanism, and which automatically insures against such strains on the conveyer, due to varying conditions, as may adversely effect the operation or effective life of the conveyer.

It is a further object of this invention to provide an improved design and mounting for a flexible traveling conveyer of this character and embodying provisions for readily and completely relieving the belt of tension and placing the belt back in normal operating condition through a simple adjusting operation.

These and other objects and advantages are attained by the present invention, various novel features of which will be apparent from the description and accompanying drawing, disclosing an embodiment of features of the invention, and will be more particularly pointed out in the claims.

In the accompanying drawing:

Fig. 1 is a fragmentary vertical sectional elevation of the forward portion of a harvester-thresher, such as is disclosed in the above mentioned parent application, the plane of section being that of the line I—I of Fig. 2;

Fig. 2 is a plan view of the forward end of the apparatus shown in Fig. 1;

Fig. 3 is a view in elevation of details of the mounting of the lower roll of the main feed conveyer or draper of the apparatus of Figs. 1 and 2; and Fig. 4 is a sectional view in the plane of the line IV—IV of Fig. 3.

Referring to the drawing, the harvester-thresher is mounted on a supporting frame carried by the axle of a pair of traction wheels 11, the latter being preferably disposed so that the weight of the apparatus is balanced about the axis of the wheels. The supporting frame includes a forwardly projecting draft frame portion which serves as a drawbar support through which tractive effort of a source of traction, such as a power tractor, may be supplied, and also as a support for a power shaft through which power is supplied from a tractor for operating several mechanisms of the apparatus. A housing 13 for the threshing mechanism is carried by the supporting frame, and an auxiliary header frame 14 is carried on the forward end of the thresher housing. A grain storage bin 16 is carried by the supporting frame at the stubbleward side of the thresher housing.

The header frame 14 is of troughlike form open at its forward and rear ends and has side walls 17 flanged at their upper edges throughout the major portion of their length, the flange 18 on the outer side wall being of tapering curvature and acting as a guide to deposit cut grain on the header frame. The side walls 17 of the header frame fit closely within side walls 19 of the housing 13 at the open forward side thereof, and the header frame is mounted on the housing 13 through a pivotal connection between the side walls of the header frame and the side walls of the housing 13, so that the lower forward edge of the header frame, and the cutting sickle carried thereby, may be swung upward and downward by suitable adjusting mechanism to a desired position of adjustment relative to the ground.

At the forward lower end of the header frame 14 is mounted a cutting sickle 30 of conventional design, and having an actuating rod operated in suitable manner.

A shield or guard 34 of generally rounded and forwardly tapering shape is attached to the lower end of the inner side wall 17 of header frame, and serves to protect operating mechanism for the sickle, and to guide grain toward the cutting sickle. The outer side wall of the header frame is extended, by an integral portion of separately secured element, in advance of the inner side wall of this frame, the upper edges, particularly the upper edge of this extended side wall being provided with a curved and forwardly tapering flange, as indicated at 35, the structure forming a relatively smooth surface splitter which enters the standing grain and serves to lift and gather fallen grain and move the same toward the sickle. The guard 34 and the splitter 35 may be supplemented by a curved upwardly rising guard ring 36 secured to the guard and splitter.

Mounted within the header frame adjacent the lower edges of the side walls thereof is a traveling conveyer 38 of the draper belt type, of conventional canvas or fabric construction, preferably provided on its outer or working surface with cross bars to catch and hold loose grain. This belt is of a width equal to substantially the full length of the sickle device, and travels over a driving roller 39 having shaft journals rotatably mounted in bearings on the side walls 17 near the upper end of the header frame and on adjacent portions of side walls 19 of housing 13, the driving shaft of this roller preferably being coincident with the axis on which the header frame is pivoted on the side walls of the housing 13. This driving shaft, indicated at 39a, projects through the outer side wall 19 of the housing 13.

The lower or foot roller 40 about which the draper 38 travels, has shaft extensions projecting through elongated apertures 41 in the side walls 17 of the header frame and is rotatable in adjustable bearings 42 having guide or positioning wings 43 cooperating with guide walls or flanges 45 formed on the side walls 17 or a plate secured thereto, these flanges serving to guide or confine the bearings in their movement in the general direction of the draper. A rod 47 is attached, preferably with some pivotal movement permitted, to the rear side of each bearing 42 and serves to position a compression spring 48 surrounding the rod and abutting a collar 49 secured on and adjacent the lower end of the rod. A collar 50, loose on the rod 47, is provided as an abutment or bearing for the upper end of the spring 48. A releasable stop 51, attached to an operating arm 52, is pivotally mounted in the side arms of a U-shaped bracket 53 secured to each side wall 17. A removable latch or pin 54 passing through the arms of the bracket 53 cooperates with the operating arm of the stop 51 to hold the latter in set position wherein the spring is held under normal desired compression. Through this arrangement, a desired degree of tension on the belt 38 is maintained in spite of variable weather conditions, the spring yielding and thereby positioning the bearings 42 of the roller shaft so as to accommodate for any shrinking or lengthening of the belt. When the apparatus is to be out of operation for an extended period, tension on the draper belt may be fully relieved by actuating the stop 51 to fully released position, this effect being obtained after removal of the latch or pin 54 from cooperation with the operating arm 52 of the stop, the compression spring 50 then being free to urge the stop to its released position, thus permitting the lower roller 40 to assume a position wherein there is no tension on the draper belt, and thus preserving the useful life of the latter.

An endless feeding conveyer draper 75 is driven by a roller 76 and travels over a second roller 78 disposed above and somewhat beyond the upper roller 39 of the conveying draper 38. Shaft extensions of the rollers 76 and 78 are mounted in bearings in the side walls 19 of the housing 13. The lower surface of the draper 75, particularly at its inner end, is adapted to press against and advance material which has been fed along and by the working surface of the draper 38.

A threshing cylinder, indicated at 81, is carried by a rotatable shaft 82 mounted in bearings in the side walls of the housing 13, and cooperates with a concave 87, preferably formed as a generally circular and imperforate portion of the housing 13.

The upper portion of the housing for the threshing cylinder follows and is relatively closely spaced from the path of the threshing bars 85 to a point adjacent the end of the upper feeding draper 75.

Power for operating the various mechanisms of the apparatus is derived from a main power shaft section 201 suitably supported on a frame portion of the machine and provided with a conventional form of forward extension for connection to a power takeoff shaft on a tractor by which the harvesting machine is pulled through the field. The shaft section 207 is suitably connected, preferably through a universal joint and a beveled gear connection, to drive a transverse shaft 223 suitably mounted on the supporting frame.

The shaft 223 is provided with a V-groove sheave 226, the latter being connected with a V-groove sheave on the operating shaft 82 of the threshing cylinder, through a V-belt 228, preferably with a suitable idler sheave cooperating with the belt to secure the desired tension thereof. A second V-groove sheave 229 is mounted on the shaft 223 and is connected through a V-belt 231 to a V-pulley 232 on the operating shaft 79 of the upper roller 76 of the feeding conveyer 75, and to a V-pulley 234 mounted on the stubbleward side wall of the header frame, preferably through a suitable idler pulley. The sheave 234 may be used as a source of power for driving the sickle device. The shaft 39a of the upper roller 39 of the feed draper 38 is preferably driven through a flexible belt drive from a sheave on the shaft 79, to impart the desired travel to such feed draper.

It is claimed and desired to secure by Letters Patent:

1. In a harvesting machine, a flexible endless traveling conveyer operatively supported on a driving and a driven roll, a supporting frame having spaced side walls, bearings for said rolls supported on the side walls of said frame, the bearings for one of said rolls being slidably mounted on said frame to permit movement of said bearings in the general direction in which the active conveying portion of said conveyer extends, a compression spring associated with and acting on each of said slidable bearings and disposed at the outer side of the adjacent wall of said frame, a rod attached to said bearing and serving as a guide for said spring, a stop pivotally supported on the outer side of said frame and in guiding relation to said rod, said stop being operable against the bias of said spring to a position wherein the bearing is yieldingly maintained in normal operative position, and quick releasable latch means cooperative with said stop to hold the latter against displacement from normal operative position, said stop on release of said latch permitting said spring to expand to thereby relieve said roll of operating pressure thereon and relieve said belt carried thereby of normal operating tension.

2. In a harvesting machine, a flexible endless traveling conveyer belt operatively supported on a driving and a driven roll, a supporting frame for said rolls having spaced side walls, adjustable bearings for one of said rolls, said bearings being slidably supported on and at the outer side of the side walls of said frame for movement in the general plane of the axes of said rolls, a spring acting on each said bearing to maintain said conveyer belt under desired operating tension, a guide rode for said spring attached at one end to said bearing, an abutment stop for said spring slidably associated with the guide rod therefor, said abutment stop being movably mounted on the outer side wall of said frame to vary the degree of strain on said spring, and quick releasable latch means cooperative with said abutment stop to hold the latter in normal operative position, said abutment stop on release of said latch being movable through action of said spring to a position wherein said conveyer belt is relieved of normal operating tension.

3. In a harvesting machine, a flexible endless traveling conveyer operatively supported on a driving and a driven roll, a supporting frame for said rolls having spaced side walls, adjustable bearings for one of said rolls, said bearings being slidably supported on the side walls of said frame for movement in the plane of the axes of said rolls, a compression spring acting on each said bearing and disposed at the outer side of the adjacent side wall of said frame, a guide rod for said spring attached at one end to said bearing, an abutment bearing for said spring slidably mounted on said rod adjacent the other end thereof, an apertured stop pivotally mounted on said frame and operative to a position wherein it forcibly bears on said abutment bearing to compress said spring to thereby yieldingly maintain said roll in normal operative position and with said belt under normal operating tension, and quick releasable latch means cooperative with said abutment to hold the latter against displacement from normal operative position, said abutment on release of said latch permitting said spring to expand to thereby relieve said roll of operating pressure thereon and relieve said belt carried thereby of normal operating tension.

WALTER R. DRAY.